3,271,335
MANUFACTURE OF CELLULOSIC BOARD AND NOVEL ADHESIVE SYSTEM THEREFOR
Logan C. Bostian, Morris Township, Morris County, and Malcolm H. Heffner, Whippany, N.J., assignors to Allied Chemical Corporation, New York, N.Y., a corporation of New York
No Drawing. Filed May 20, 1963, Ser. No. 281,823
18 Claims. (Cl. 260—17.2)

This invention relates to new and improved cellulosic board and to a novel adhesive system for such products. More particularly, the invention relates to particle board of improved strength properties and to its manufacture employing a new combined adhesive system.

Particle board generally designates a class of board products in which wood chips, shavings, sawdust, or fibers, etc. are bound together by moderate amounts of synthetic adhesive, usually urea-formaldehyde or phenol-formaldehyde. These board products are conventionally produced from stock containing the wood particles moistened with limited amounts of water and intimately mixed or coated with the water-soluble formaldehyde adhesive. The board is formed by compressing the stock to the desired board thickness at elevated temperatures to cure the adhesive. The use of the costly synthetic adhesives in particle board makes this type of board a "premium" product and distinguishes these boards from the class of products known as "hardboard" which are produced by the pressing and felting out of fibers slurried in large amounts of water with the binder for the board being supplied primarily by the natural ligneous matter in the fiberized wood itself. Particle boards major uses are as building panelling, both interior and exterior, and in the manufacture of furniture where a board of good dimensional stability, resistance to water absorption and uniform surface qualities are required.

While particle board manufacture has been generally satisfactory there has been much room for improvement. One important aspect of particle board manufacture in which improvement is particularly desired concerns the strength properties of the product. Generally, it has not been possible to obtain high strength properties with the conventionally employed adhesives, i.e. the urea-formaldehyde and phenol-formaldehyde resins. This has also been true despite the total amount of the adhesive used in make up of the particle board, with relatively little increase in strength properties being obtained even though large amounts of adhesive material are used. Of particular concern in this respect has been the flexural strength of particle board which in the past has barely attained minimum standards with the thermosetting formaldehyde adhesives.

An object of the present invention is to provide a new and improved particle board, and particularly a particle board having improved strength properties. Another object of the invention is to provide a new and improved adhesive for board products, and more particularly a novel adhesive system for producing particle board of improved flexural strength. Other objects and advantages of the invention include the general improvement of the manufacture of particle board utilizing a new combined adhesives system adapted to produce particle board of improved flexural strength.

In accordance with the present invention it has been found that particle board of improved strength properties is obtained when the board contains as binder therefor about 4 to 20 percent, preferably about 5 to 10 percent, by dry weight of the wood particles of a combined adhesives system comprising: (a) about 40–90 percent, preferably 50–80 percent, of a thermosetting water-soluble formaldehyde resin selected from the group consisting of urea-formaldehyde and phenol-formaldehyde, and (b) about 10–60 percent of a thermoplastic chlorinated polyethylene resin containing about 25–65% by weight chlorine, preferably an oxidized chlorinated polyethylene, desirably about 20–50% of an oxidized chlorinated polyethylene having a chlorine content of about 40 to 60% by weight. The particle board of the invention containing the combined adhesives system has been found to exhibit substantially improved flexural strength, greater than that obtained with equivalent amounts of the thermosetting formaldehyde resins and also greater than that obtained with equivalent amounts of the chlorinated polyethylene resin. No explanation of the apparent cooperation between the thermosetting formaldehyde resin and the thermoplastic chlorinated polyethylene resin can be given with certainty. However, the proportions in which the thermosetting formaldehyde resin and thermoplastic chlorinated polyethylene resin are mixed in the combined system are fairly important. Generally, the thermosetting formaldehyde resin should constitute within the range of about 40–90 percent, preferably within the range of about 50–80 percent, of the total amount of adhesive. The amount of chlorinated polyethylene resin employed should constitute about 10–60 percent, preferably about 20–50 percent of the combined adhesive system. At least about 10 percent of the chlorinated polyethylene resin is required in the make up of the combined system to obtain an increase in flexural strength of the particle board. Increasing the amount of chlorinated polyethylene in combination with the formaldehyde resins above about 60 percent has been found to give less advantageous strength properties and also to depreciate surface quality of the particle board, particularly the resistance of the board to water absorption which is reduced to an undesirable level. The preferred adhesive systems containing 50–80 percent of the thermosetting formaldehyde resin and 20–50 percent of the chlorinated polyethylene resin are those found to provide the best combination of the desired board properties including flexural strength and resistance to water absorption. The present invention provides a particle board of substantially improved flexural strength for a given amount of adhesive over those boards containing only the thermosetting formaldehyde resins. The invention may also be adapted, if desired, to produce particle board of improved flexural strength in which the amount of adhesive and thus the cost thereof in the particle board is advantageously reduced by a significant amount, as much as 20 percent and even greater.

Particle board of improved flexural strength may be prepared in accordance with the invention by first forming stock of water-moistened wood particles intimately mixed and coated with about 4 to 20 percent, preferably about 5 to 10 percent, by dry weight of the wood particle of the combined thermosetting formaldehyde resin-thermoplastic chlorinated polyethylene resin adhesives, the formaldehyde resin preferably being mixed with the particles by dispersion therein in the form of an aqueous solution and said chlorinated polyethylene resin being preferably mixed with the particles by dispersion therein in the form of dry resin solids. The stock containing the water-moistened wood particles intimately mixed with the adhesive materials is readily formed into high quality particle board by compression of the stock at a platen temperature of about 150–250° C., preferably a temperature of about 175–200° C., for a time sufficient to at least partially cure the thermosetting resin.

In the preferred forms of practice for carrying out the invention to produce particle board of improved flexural strength the particle board stock is first formed by intimately admixing the wood particles with water and with from 4 to 20 percent, preferably 5 to 10 percent, by weight of wood particles, of the bonding material comprising the indicated proportions of the thermosetting formaldehyde resin and thermoplastic chlorinated polyethylene resin. Stock formation is preferably accomplished batch-wise by dispersing the water and adhesive materials into particles which are agitated in a suitable mixer, preferably in a mixer adapted to subject the particles to a planetary action or movement. While the particles are agitated the thermosetting formaldehyde resin is dispersed into the moving particle stream along with the water in the form of an aqueous solution containing about 5 to 30 percent resin solids. Dispersion of the aqueous solution is preferably accomplished by spraying from a suitably centralized location above the agitator. The amount of water introduced into the stock may vary over a fairly wide range and is generally dependent upon the requirement of providing particles sufficiently water-moistened to retain or coat the adhesive materials thereon. The water in the aqueous resin solution acts as a dispersing medium for the formaldehyde resins and it is therefore preferred to introduce substantially all of the water required in the stock along with the formaldehyde resin solution. The formaldehyde resin solution feed rates are generally controlled so that all the particles are subjected to the spray action at least once and preferably about 4 times. The actual amount of water required generally varies from about 5 to 40 percent by dry weight of the wood particles and is preferably within the range of about 10 to 25 percent by dry weight of the wood. As conventional in particle board manufacture the usual small amounts of water-proof sizing material are added to the stock. The actual amount of sizing material is preferably about 0.5 to 8.5 percent by dry weight of the wood. Suitable sizing materials include the hydrocarbon waxes such as paraffin wax, oxidized polyolefin waxes and polyolefin waxes which are preferably emulsified in water with agents such as long chain alkyl aryl sulfonates and alkyl aryl polyether alcohols. The water-proofing agents in emulsified form are preferably introduced into the stock in admixture with the formaldehyde resin solution. The chlorinated polyethylene resin is preferably introduced into the wood particles in the form of dry solids. This may be suitably accomplished by employing an agitating screen or similar mechanism disposed over the circulated particles and adapted to feed controlled amounts of chlorinated polyethylene solids into the stock. The chlorinated polyethylene resins solids are preferably introduced into the circulating particles simultaneously with the formaldehyde resin solution with feed rates of the chlorinated polyethylene solids being preferably adjusted such that dispersion time of the solids is co-extensive with the introduction of the formaldehyde solution. In this manner more uniform stock is obtained in which both the thermosetting formaldehyde resin and thermoplastic chlorinated polyethylene resin are intimately coated on the particles. The chlorinated polyethylene solids may be dispersed into the circulated particles other than simultaneously with the formaldehyde resin solution. Thus, the formaldehyde solution may be separately dispersed into the stock to coat the particles and the chlorinated polyethylene solids then introduced and coated on the particles where they are held by the formaldehyde resin coating. Introduction of the chlorinated polyethylene solids prior to the formaldehyde resin solution is less effective inasmuch as the resin solids do not adhere as well to the wood particles and tend to settle out from the stock. By introducing the chlorinated polyethylene resin in the form of dry solids the board stock may be produced with less amounts of water than conventionally required to disperse the bonding material. Thus, processing advantages may be gained, particularly during the pressing operation in which the cure time is largely a function of the amount of water present in the stock. While introduction of chlorinated polyethylene in the form of dry solids is preferred, other forms of introduction may be employed. For example, the chlorinated polyethylene solids may be emulsified and mixed with the formaldehyde solution for dispersion into the stock in spray form. Suitable emulsifying agents for this purpose include the long chain alkyl aryl sulfonates and alkyl aryl polyether alcohols. After introduction of the adhesive materials agitation of the stock is preferably continued for a short time, usually about 3 to 15 minutes to assure uniform distribution and coating of the adhesive materials on the particles. In carrying out the invention the particle size of the chlorinated polyethylene resin may vary over a fairly wide range. Generally, the chlorinated polyethylene resins of normal particle size of about 40 to 60 mesh may be employed in carrying out invention. Chlorinated polyethylene of reduced particle size range from about 60 to 100 mesh may be employed to advantage to obtain maximum resin distribution and strength, particularly when the bonding material contains the higher proportions of the chlorinated polyethylene resin. Chlorinated polyethylene resins of reduced particle size may be obtained by grinding or pulverization in apparatus conventional for such purposes.

The particle board stock containing the wood particles intimately mixed and coated with the combined adhesive material may be readily formed into board using conventional particle board apparatus. The stock is distributed within the frame of a suitable particle board forming press with the height of stock varying generally upon the thickness and density of the board to be produced. The stock is then compressed under pressures of about 50 to 2000 p.s.i., preferably about 100 to 500 p.s.i., at platen temperatures of about 150–250° C., preferably about 175 to 200° C., for a time sufficient to at least partially cure the thermosetting formaldehyde resin in the board. Generally a minimum temperature of about 150° C. is required to provide sufficient heat to evaporate volatile materials. Temperatures in excess of about 250° C. are usually avoided to prevent decomposition of the chlorinated polyethylene and also to prevent surface burning. At least about 10 minutes heating time is required to sufficiently heat and cure the adhesive materials throughout the board. Cure time may be as much as 60 minutes depending generally on the amount of water in the stock and on the thickness and density of the board to be produced. The preferred cure times are generally within the range of about 10 to 20 minutes. If desired, the boards removed from the press may be cooled rapidly at temperatures of about 0° C. to 20° C. to quickly set the chlorinated polyethylene adhesive.

The particle board of the present invention may also be formed from the stock containing the water-moistened particles intimately mixed and coated with the combined adhesives by first compressing the stock to form a preliminary mat. This may be suitably accomplished by distributing the stock on a suitable base and subjecting the stock with rollers or plates to a pressure of about 40 to 60 p.s.i. at about normal temperatures, i.e. about 25 to 50° C., for about 0.5 to 5 minutes, preferably about 0.5 to 2 minutes, to form a compressed mat in which the particles are held together by the inherent adhesive nature of the formaldehyde resin solution at normal temperatures. The preliminary mat is then formed into the final particle board product by compression under pressure of about 100 to 500 p.s.i. at elevated temperatures of about 150–250° C., preferably about 175 to 200° C. for the time sufficient to at least partially cure the thermosetting formaldehyde resin. The formation of a preliminary mat from the coated wool particles has the advantages of removal of excess fluid materials, increased absorption of adhesive systems by wood particles, and easier handling. If desired, particle board may also be produced in this manner on a continuous basis.

The formaldehyde resin employed in the present invention in combination with the chlorinated polyethylene may be any of the urea-formaldehyde or phenol-formaldehyde resins well known in the art as suitable for the bonding of cellulosic material. The urea-formaledhyde resins of this type are generally thermosetting and water-soluble. The urea-formaldehyde resins preferably employed in carrying out the invention are those which contain about 1.8 to 2.2 mols of formaldehyde per mol of urea, of which about 0.3 to 0.4 mol of formaldehyde per mol of urea are uncombined. The preferred urea-formaldehyde may be obtained commercially in about 50 to 70 percent aqueous solution. Such a resin is catalyzed by a buffer system, which is adjusted to give a pH in the range 5.0 to 7.5. Suitable buffer systems are sodium hydroxide-formic acid and borax-boric acid. The preferred urea-formaldehyde resins are soluble in water, and alcohol at 25° C. and insoluble in benzene and toluene at 25° C. The phenol-formaldehyde resins employed in carrying out the invention are also thermosetting and water-soluble. The preferred phenol-formaldehyde resins generally contain about 2.0 to 2.5 mols of formaldehyde per mol of phenol, of which about 0.1 to 0.2 mol of formaldehyde per mol of phenol are uncombined. These resins are also obtained commercially in aqueous solution and contain about 0.021 to 0.023 mol per mol of formaldehyde of a basic catalyst such as sodium hydroxide, potassium hydroxide and calcium hydroxide, preferably sodium hydroxide. The preferred phenol-formaldehyde resins are soluble in water, alcohol and acetone at 25° C. and insoluble in benzene and toluene at 25° C.

The chlorinated polyethylene employed in carrying out the present invention may be any chlorinated ethylene polymer containing about 25–65% by weight chlorine, preferably about 40–60% chlorine. Chlorinated polyethylenes of high molecular weight may be used although the chlorinated polyethylenes of low and intermediate molecular weight are usually employed. Both amorphous and crystalline polyethylenes may be employed with some preference for the more amorphous materials, i.e. those containing less than about 5% crystallinity as determined, for example, by differential thermal analysis. It has been found that particularly good results are obtained in producing a particle board of improved flexural strength when employing an oxidized chlorinated polyethylene, i.e. a chlorinated polyethylene containing small amounts of oxygen preferably added to the basic polyethylene polymer during chlorination. The actual amount of added oxygen in the oxidized chlorinated polyethylene is about 1.0 to 0.05% by weight, more usually between about 0.5 to 0.1% by weight.

The chlorinated polyethylenes are conveniently and preferably prepared from a high molecular weight, low pressure, linear crystalline, high density polyethlene having a 1.0 to 5.0 million weight average molecular weight. The preferred oxidized chlorinated polyethylenes are obtained by conducting the chlorination of the high molecular weight polyethylene in aqueous suspension in the presence of an oxidant. Suitable oxidants include benzoyl peroxide, oxygen, hydrogen peroxide and acetyl peroxide, preferably oxygen. The total oxygen is preferably present throughout the chlorination in amounts of less than 5% by weight based on the chlorine supplied, usually about 0.05–1.0% based on the chlorine employed during the chlorination. Chlorination of high molecular weight polyethylene is desirably carried out in stages with at least about 5% chlorine, preferably about 17% chlorine, added at a temperature below about 110° C., preferably between 80—100° C. with additional chlorine, at least about 5%, being added to the polymer at a temperature above about 120° C. preferably at a temperature between about 135–150° C. The oxygen is preferably added along with the chlorine after the initial 5% chlorine has been introduced into the polymer. The chlorinated polyethylene produced by oxidative chlorination of the indicated high molecular weight polyethylene has molecular weight corresponding to an intrinsic viscosity of about 0.5 to 2.

The linear high molecular weight polyethylene desirably used for the preparation of the chlorinated polyethylenes is preferably produced by the gas phase polymerization of an anhydrous, oxygen-free ethylene over a porous frangible supported catalyst prepared from an inorganic compound of chromium and oxygen and an active alkyl metal. The catalyst support is prepared from silica or silica-aluminum. Suitable linear high molecular weight polyethylenes which may also be characterized by containing long chain branches are readily produced in accordance with British Patent 858,674 of January 11, 1961. The polyethylene prepared in accordance with that patent have crystallinity of at least 75%, usually 75% to 85%, a density between about 0.935 and 0.985 and a weight average molecular weight between about 1.0 to 5.0 million calculated according to the method of P. S. Francis et al. from the viscosity of about 0.05 to 0.1 gram per 100 cc. solution in decalin using the equation:

$$[\eta] = 6.77 \times 10^{-4} M^{0.67}$$

where $[\eta]$ = intrinsic viscosity
$M$ = weight average molecular weight (J. Polymer Science, vol. 31, pp. 453–466—September 1958).

Chlorinated polyethylene of low and intermediate molecular weight may also be produced from the preferred high molecular weight ethylene polymer in the aqueous suspension chlorination process with or without the use of oxidants. This may be accomplished by reducing the molecular weight of the high molecular weight low pressure polyethylene prior to chlorination by thermal degradation in accordance with the process described in British Patent 858,674 of January 11, 1961. By means of said process, the low pressure, high molecular weight polyethylene is thermally degraded by depolymerized by heating said ethylene polymer at a temperature of about 370° C. in the absence of oxygen. If desired, shearing forces may be applied during the processing. The polyethylenes produced from the high molecular weight polymers by the thermal degradation are substantially linear materials having molecular weights within the range of about 36,000 to 300,000 and densities within the range of about 0.945 to 0.985 gm./cm.³.

The particle board of the present invention incorporating the combined adhesives system may also include limited amounts of other materials including inorganic fillers such as asbestos fibers and particulate materials such as pigments. Organic substances such as dyes may also be included where boards having special effects are desired.

It will be evident that the combined adhesives system of the present invention may also be used in the manufacture and fabrication of wood and cellulosic products in addition to particle board. The combined urea- or phenol-formaldehyde-chlorinated polyethylene adhesive may be used most advantageously where high strength bonding of wood and cellulosic materials is required, particularly for products produced by the application of high heat and pressures. For example, the combined adhesives system may be effectively employed in the fabrication of wood veneers as in plywood manufacture and also in the manufacture of other wood products such as structural shapes.

The following examples in which parts are by weight illustrate the practice and advantages of the present invention.

*Examples 1–5*

Particle board samples are made from Aspen wood chips which have average size of about 1.0″ x 0.5″ x 0.001. For each sample about 175 parts of the wood chips are charged to a mixing vessel equipped with an impeller connected to a 50–100 r.p.m. variable speed motor. The wood chips are then agitated and during agitation spray coated with an aqueous mixture containing urea-formaldehyde resin solids and "Paracol" type No. 404N. "Paracol" is a trademark for a water dispersible wax emulsion. The urea-formaldehyde resin is supplied from an aqueous 65 percent solids solution containing, on the 100 percent solids basis, the equivalent of about 33 percent urea and about 67 percent formaldehyde. After about 5 minutes agitation chlorinated polyethylene resin solids are added and agitation continued for an additional 5 minutes to distribute the chlorinated polyethylene solids on the coated chips. The amounts of resin solids, water, and wax emulsion employed for each particle board sample are given in Table 1.

The chlorinated polyethylene resin had a chlorine content of about 50% by weight and a molecular weight corresponding to an intrinsic viscosity of about 0.72 in o-dichlorobenzene at 100° C. Particle size of the chlorinated polyethylene was about .84 micron. The chlorinated polymer was prepared from crystalline, low pressure, high density polyethylene of about 2.7 million molecular weight by aqueous slurry chlorination at different temperature stages with chlorination in the first stage to a chlorine content of about 17 percent at temperature of about 90° C., then at a temperature of about 138-145 C°· to a chlorine content of about 25 percent and thereafter at a temperature of about 110-120° C. in the presence of about 1% oxygen based on the chlorine used until 50 percent chlorine had been added to the polymer. The crystalline, low pressure, high density polyethylene employed as starting material for the chlorinated polyethylene was prepared in accordance with British Patent 858,674 (Example 6).

The coated wood chips are then evenly distributed within a 5″ x 6″ x 4″ steel frame to a height averaging about 3 inches. A 5″ x 6″ x 3″ wooden block placed over the coated chips in the frame is compressed under a pressure of about 65 p.s.i. at room temperature for about 2 minutes to pre-press the chips and to form a preliminary mat of about 2 inch thickness. The pre-pressed mat is then transferred to a Carver press and press-cured against 9/16 inch stops using a pressure of about 65 p.s.i. and platen temperature of 180° C. The mat is pressed and cured at the platen temperature for about 42 minutes. The hot board samples removed from the press are cooled rapidly in a freezer at about 10° C. for about 15 minutes. Board data including coating formulations and test results are summarized below in Tables I and II, respectively.

TABLE I.—COATING FORMULATION

| Ex. | CPE | Parts/175 parts Aspen wood chips | | | | Resin, percent Dry Wood |
|---|---|---|---|---|---|---|
| | | Urea-F | Water | Wax | Total Resin | |
| 1 | 0.0 | 18.2 | 23.8 | 3.5 | 18.2 | 10.4 |
| 2 | 0.0 | 25.0 | 32.8 | 3.5 | 25.0 | 14.3 |
| 3 | 4.0 | 13.0 | 17.0 | 3.0 | 17.0 | 9.7 |
| 4 | 13.0 | 13.0 | 17.0 | 3.0 | 26.0 | 14.9 |
| 5 | 27.0 | 3.4 | 31.1 | 3.5 | 30.4 | 17.3 |

TABLE II.—PRODUCT

| Ex. | Resin Solids, Wt. Percent Dry Board | | | Flexural Strength, p.s.i. |
|---|---|---|---|---|
| | CPE | Urea-F | Total | |
| 1 | 0.0 | 10.2 | 10.2 | 2,670 |
| 2 | 0.0 | 13.5 | 13.5 | 2,710 |
| 3 | 2.4 | 7.5 | 9.9 | 3,030 |
| 4 | 7.5 | 7.5 | 15.0 | 3,580 |
| 5 | 14.4 | 2.8 | 17.2 | 2,000 |

As shown by Tables I and II, the combined chlorinated polyethylene-urea-formaldehyde adhesive system gives improved results over that in which only urea-formaldehyde is used. Examples 1 and 3 show that the combination with urea-formaldehyde of only minor portions of chlorinated polyethylene resin—about 23 percent of the total adhesive solids—results in a substantial improvement in flexural strength over board products containing about the same total amount of only the urea-formaldehyde. Examples 2 and 3 show that substantially less total amounts of the combined adhesive are required to produce a board which still exhibits a superior flexural strength over that of the boards containing larger amounts of only urea-formaldehyde. Examples 2 and 4 show that increasing the ratio of chlorinated polyethylene to urea-formaldehyde in the combined adhesive system to about 1:1 results in a still greater increase in flexural strength over the board products containing about the same amount of only the urea-formaldehyde adhesive. Examples 2 and 4 also show that weight percent of total adhesive in the board product slightly increased over weight percent adhesive in the coating formulation when the combined system is used indicating maximum retention of the combination adhesive system in the board during compression. The weight percent adhesive in the product was reduced over that in the coating formulation for urea-formaldehyde resin. Similar results are also shown by comparing Examples 1 and 3 indicating slightly better retention of the combined adhesive in the pressed mat. Example 5 shows that further increasing the amount of chlorinated polyethylene in the combined system to the higher ratios of chlorinated polyethylene to urea-formaldehyde—about 8:1—results in a marked depreciation in flexural strength of the board product even though the total amount of resin in the combined system is greater than the amount of resin employed in Examples 1-4. Example 5 also shows a slightly reduced percentage of resin solids in the dry board over the percentage of resin solids in the coating formulation indicating that a combined system in which chlorinated polyethylene predominates will have less than maximum retention of the resin in the pressed board. Further examination of the board product of Example 5 shows it to also have undesirably high water absorption properties.

*Examples 6-7*

Two additional particle board samples all prepared using same procedure and material as in Examples 1-5 except that the chlorinated polyethylene of about 50% chlorine was prepared without addition of an oxidant. The amounts of resin solids, water, and wax emulsion employed for each board are given in Table III. Tests results are summarized in Table IV.

TABLE III.—COATING FORMULATION

| Ex. | CPE | Parts/175 parts Aspen wood chips | | | | Resin, percent Dry Wood |
|---|---|---|---|---|---|---|
| | | Urea-F | Water | Wax | Total Resin | |
| 6 | 3.5 | 13.0 | 17.0 | 3.0 | 16.5 | 9.4 |
| 7 | 13.0 | 13.0 | 17.0 | 3.0 | 26.0 | 14.9 |

TABLE IV.—PRODUCT

| Ex. | Resin Solids, Wt. Percent Dry Board | | | Flexural Strength, p.s.i. |
|---|---|---|---|---|
| | CPE | Urea-F | Total | |
| 6 | 2.0 | 7.5 | 9.5 | 2,900 |
| 7 | 7.5 | 7.5 | 15.0 | 3,250 |

As shown by Tables III and IV, when compared with Tables I and II, the combined adhesive in which the unoxidized chlorinated polyethylene is employed results in improvement in strength properties although not quite as superior as obtained with the oxidized chlorinated polyethylene.

*Examples 8-11*

Using the same procedure as in Examples 1-5, particle board samples containing a phenol-formaldehyde resin are prepared and evaluated. The phenol-formaldehyde resin is supplied from an aqueous solution containing, on the 100 percent solids basis, the equivalent of about 31 percent phenol, about 69 percent formaldehyde and about 0.0214 percent sodium hydroxide catalyst. The chlorinated polyethylene employed in the combined adhesive system is the same oxidized chlorinated polyethylene employed in Examples 1–5. The amounts of resin solids, water, and wax emulsion employed for each particle board sample are given in Table V. The board data including test results are summarized in Table VI.

TABLE V.—COATING FORMULATION

| Ex. | Parts/175 parts Aspen wood chips | | | | | Resin, percent Dry Wood |
| --- | --- | --- | --- | --- | --- | --- |
| | CPE | Phenol-F | Water | Wax | Total Resin | |
| 8 | 0.0 | 18.0 | 23.6 | 3.5 | 18.0 | 10.3 |
| 9 | 0.0 | 24.0 | 32.2 | 3.5 | 24.0 | 13.7 |
| 10 | 4.0 | 13.0 | 17.0 | 3.0 | 17.0 | 9.7 |
| 11 | 13.0 | 13.0 | 17.0 | 3.0 | 26.0 | 14.9 |

TABLE VI.—PRODUCT

| Ex. | Resin Solids, Wt. Percent Dry Board | | | Flexural Strength, p.s.i. |
| --- | --- | --- | --- | --- |
| | CPE | Phenol-F | Total | |
| 8 | 0.0 | 10.2 | 10.2 | 2,770 |
| 9 | 0.0 | 13.4 | 13.4 | 2,850 |
| 10 | 2.4 | 7.5 | 9.9 | 3,320 |
| 11 | 7.5 | 7.5 | 15.0 | 3,710 |

As shown by Tables V and VI, the combined chlorinated polyethylene-phenol-formaldehyde adhesive system also gives generally improved results over that in which only phenol-formaldehyde is used. Examples 8 and 10 show that the combination with phenol-formaldehyde of only minor amounts of the oxidized chlorinated polyethylene resin—about 23 percent of the total adhesive solids—results in substantial improvement in flexural strength over the board containing about the same total amount of only the phenol-formaldehyde. Examples 9 and 10 show that substantially less total amounts of the combined chlorinated polyethylene-phenol-formaldehyde adhesive system are required to produce a board which has a flexural strength which is still superior to that of boards containing larger amounts of only phenol-formaldehyde. Examples 9 and 11 indicate that increasing the ratio of chlorinated polyethylene to phenol-formaldehyde in the combined adhesive system to about 1:1 results in a still greater increase in flexural strength over the board products containing the same amount of phenol-formaldehyde Examples 10 and 11 both show good retention of the combined adhesive system in the present board.

In Tables I, III, and V, above, the parts of chlorinated polyethylene (CPE) and formaldehyde resin are given on the basis of 100 percent dry resin solids. The values given for the water in the coating formulation include water included from the solution of formaldehyde resin plus water added to the coating formulation to form a working mixture.

In Tables II, IV, and VI, above, flexural strength is determined according to ASTM test D1037–56T.

Although certain preferred embodiments of the invention have been disclosed for purpose of illustration, it will be evident that various changes and modifications may be made therein without departing from the scope and spirit of the invention.

We claim:

1. The method for manufacture of pressed wood particle board which comprises forming stock of water-moistened wood particles intimately mixed with about 4 to 20 percent by dry weight of the wood particles of bonding material comprising the combination of: (a) about 10–60 percent of a chlorinated low pressure, linear polyethylene resin containing about 25–65 percent by weight chlorine, and (b) about 40–90 percent of a water-soluble formaldehyde resin selected from the group consisting of urea-formaldehyde and phenol-formaldehyde, and thereafter comprising said stock and heating to at least partially cure said formaldehyde resin and form said stock into pressed wood particle board.

2. The method for manufacture of pressed wood particle board which comprises forming stock of water-moistened wood particles intimately mixed with about 4 to 20 percent by dry weight of the wood particles of bonding material comprising the combination of: (a) about 10–60 percent of an oxidized chlorinated low pressure, linear polyethylene resin containing about 25–65 percent by weight chlorine, and (b) about 40–90 percent of a water-soluble formaldehyde resin selected from the group consisting of urea-formaldehyde and phenol-formaldehyde, and thereafter compressing said stock at elevated temperature between about 150° C. to 250° C. to form said stock into pressed wood particle board.

3. The method of claim 2 in which the formaldehyde resin is urea-formaldehyde.

4. The method of claim 2 in which the formaldehyde resin is phenol-formaldehyde.

5. The method of claim 2 in which the formaldehyde resin is urea-formaldehyde, said stock being formed by intimately admixing said urea-formaldehyde in the form of an aqueous solution with wood particles, and the oxidized chlorinated polyethylene resin being intimately admixed in the form of dry solids with the wood particles.

6. The method for manufacture of pressed wood particle board which comprises forming stock of water-moistened wood particles intimately mixed with about 5 to 10 percent by dry weight of the wood particles of bonding material comprising the combination of: (a) about 20–50 percent of a chlorinated low pressure, linear polyethylene resin containing about 25–65 percent by weight chlorine, and (b) about 50–80 percent of a water-soluble formaldehyde resin selected from the group consisting of urea-formaldehyde and phenol-formaldehyde, and thereafter compressing said stock at elevated temperature between about 150° C. to 250° C. to form said stock into pressed wood particle board.

7. The method of claim 6 in which the formaldehyde resin is urea-formaldehyde and the chlorinated polyethylene resin has a chlorine content of about 40–60 percent by weight.

8. The method of claim 6 in which the formaldehyde resin is phenol-formaldehyde and the chlorinated polyethylene resin has a chlorine content of about 40–60 percent by weight.

9. Particle board composed of wood particles and about 4–20 percent by dry weight of the wood particles of a binder composed of: (a) about 10–60 percent of a chlorinated low pressure, linear polyethylene resin containing about 25–65 percent by weight chlorine, and (b) about 40–90 percent of a water-soluble formaldehyde resin selected from the group consisting of urea-formaldehyde and phenol-formaldehyde.

10. Particle board composed of wood particles and about 4–20 percent by dry weight of the wood particles of a binder composed of: (a) about 10–60 percent of an oxidized chlorinated low pressure, linear polyethylene resin containing about 25–65 percent by weight chlorine, and (b) about 40–90 percent of a water-soluble formaldehyde resin selected from the group consisting of urea-formaldehyde and phenol-formaldehyde.

11. Particle board composed of wood particles and about 5–10 percent by dry weight of the wood particles of a binder composed of: (a) about 20–50 percent of an oxidized chlorinated low pressure, linear polyethylene resin having a chlorine content of about 40–60 percent by weight chlorine, and (b) about 50–80 percent of a water-soluble formaldehyde resin selected from the group consisting of urea-formaldehyde and phenol-formaldehyde.

12. The particle board of claim 11 in which the formaldehyde resin is urea-formaldehyde.

13. The particle board of claim 11 in which the formaldehyde resin is phenol-formaldehyde.

14. An adhesive system for bonding of wood comprising the combination of: (a) about 10–60 percent of a chlorinated low pressure, linear polyethylene resin containing about 25–65 percent by weight chlorine, and (b) about 40–90 percent of a water-soluble formaldehyde resin selected from the group consisting of urea-formaldehyde and phenol-formaldehyde.

15. An adhesive system for bonding of wood comprising the combination of: (a) about 10–60 percent of an oxidized chlorinated low pressure, linear polyethylene resin containing about 25–65 percent by weight chlorine, and (b) about 40–90 percent of a water-soluble formaldehyde resin selected from the group consisting of urea-formaldehyde and phenol-formaldehyde.

16. An adhesive system for bonding of wood comprising the combination of: (a) about 20–50 percent of an oxidized chlorinated low pressure, linear polyethylene resin having a chlorine content of about 40–60 percent by weight chlorine, and (b) about 50–80 percent of a water-soluble formaldehyde resin selected from the group consisting of urea-formaldehyde and phenol-formaldehyde.

17. The adhesive system of claim 16 in which the formaldehyde resin is urea-formaldehyde.

18. The adhesive system of claim 16 in which the formaldehyde resin is phenol-formaldehyde.

References Cited by the Examiner
UNITED STATES PATENTS 3,023,136  2/1962  Himmelheber _____ 260—17.3

SAMUEL H. BLECH, *Primary Examiner.*

LOUISE P. QUAST, *Examiner.*

E. M. WOODBERRY, *Assistant Examiner.*